United States Patent Office 3,573,189
Patented Mar. 30, 1971

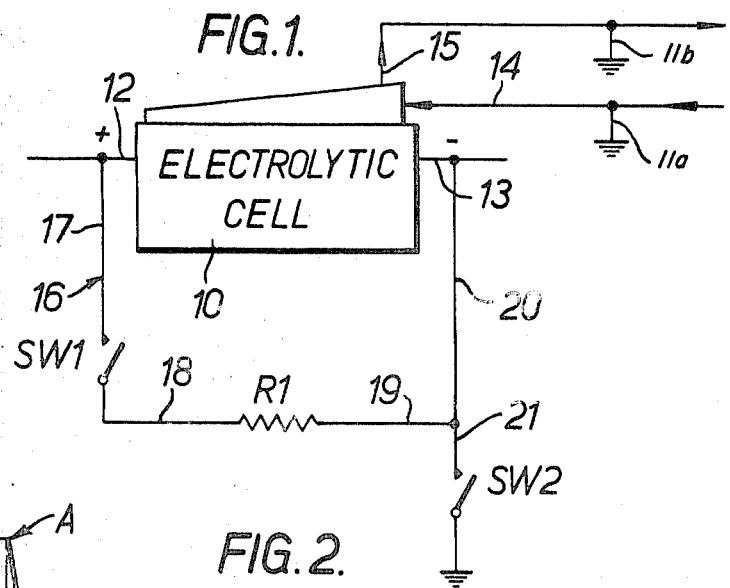
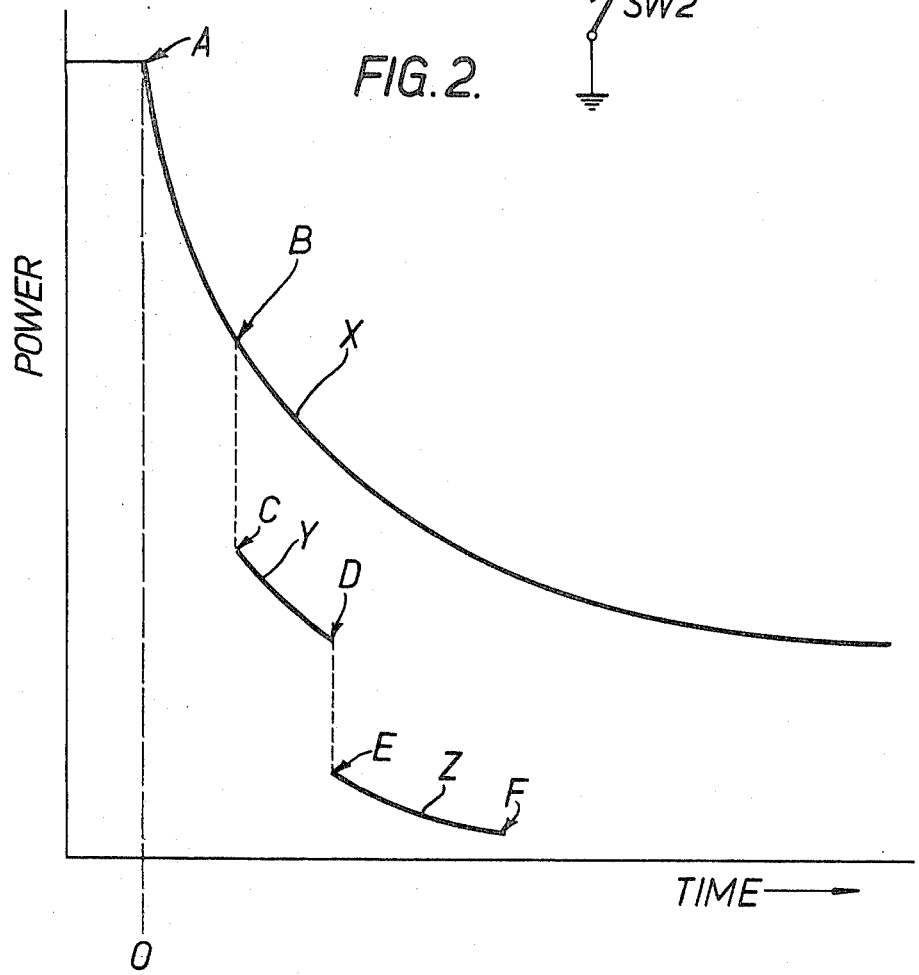

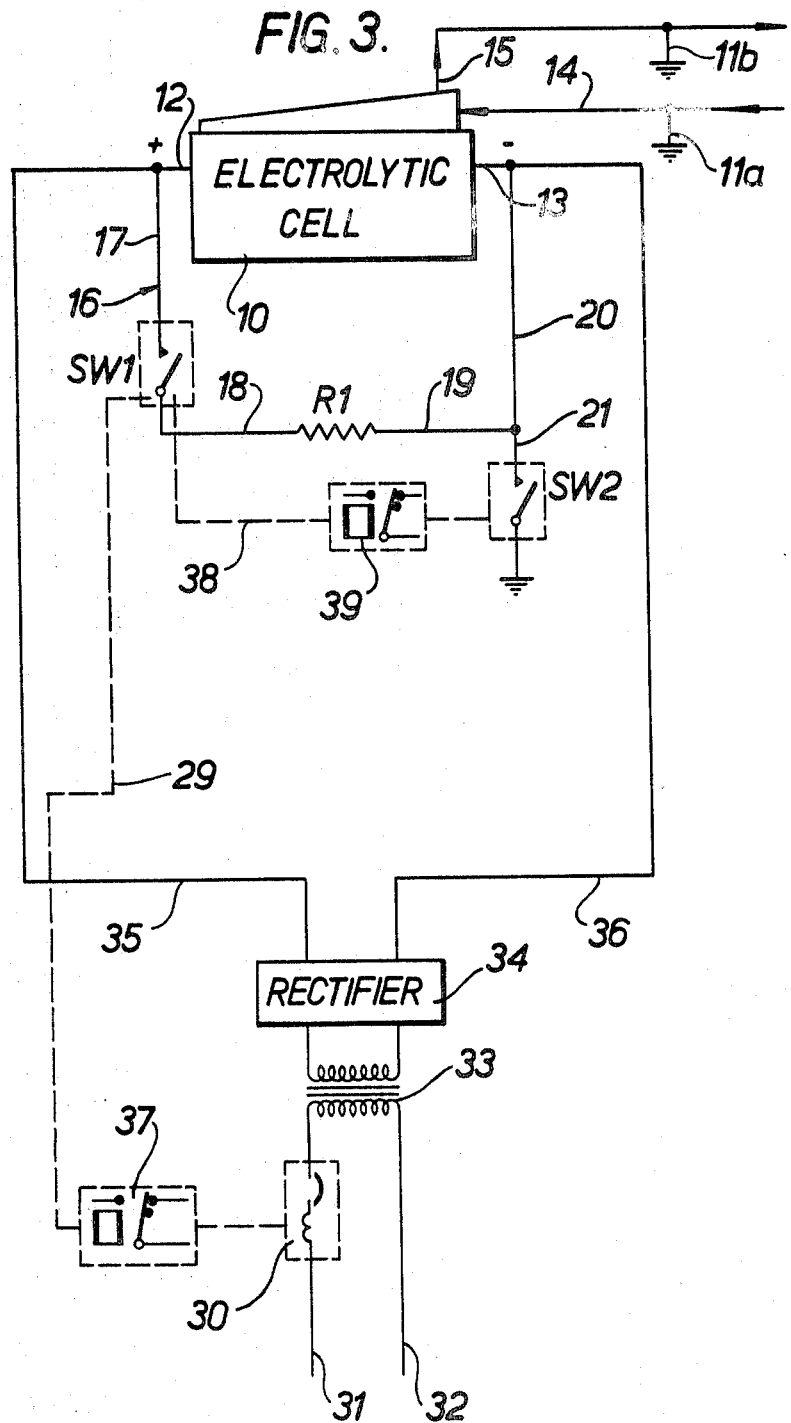

3,573,189
ELECTRICAL BUS BAR GROUNDING
Göthe O. Westerlund, Vancouver, British Columbia, Canada, assignor to Chemech Engineering Ltd., Vancouver, British Columbia, Canada
Filed Oct. 17, 1967, Ser. No. 675,935
Int. Cl. B01k 3/0; C01b 11/26
U.S. Cl. 204—228                                       3 Claims

ABSTRACT OF THE DISCLOSURE

A system is provided for dissipating the residual charge in an electrolytic cell. The system includes an external circuit having a normally open switch and resistor in series, connected across the positive and negative poles of the electrolytic cell. The system also includes a grounding circuit, operative after the external circuit has been completed by closing the normally open switch.

An improved method of operating an electrolytic cell is provided which involves grounding the positive and negative terminals after the power input to the cell has been shut off.

---

This invention relates to improvements in electrical connections associated with electrolytic cells and in the methods of operation of such electrolytic cells.

Electrolytic cells for the effecting of electrolysis reactions are now well known. However, in the case of such electrolytic cells, the bus bars connected to the cells retain an electrical energy charge for an extensive period of time which may be as high as several hours after the flow of electricity to the bus bars has been discontinued. During such period of time, it would be hazardous for personnel to work on the bus bars or on the cells. Furthermore, if the electrical system comprises polarity reversal switches, a changing of polarity before discharging the bus bar could seriously damage the rectifying equipment which is used to convert the standard alternating current into direct current for use in these cells. The problem is normally more severe if several cells are connected in series, and exists both for monopolar electrolytic cells and bipolar electrolytic cells.

It is clear that to wait for the energy to dissipate would, in most cases, represent production losses and would thus constitute an economic disadvantage. In addition, it would result in a poor plant load factor. The electrical potential difference between the positive and negative bus bars is due to the resistance offered by the cells and the energy is the capacity of the electrodes' electrolyte and dependent upon the electrical current leakage internally and externally of the cells.

An object of a principal aspect of the present invention is to provide a system for effectively discharging the electrical energy charge on the bus bars and/or electrolytic cell after the flow of direct current to the bus bars has been discontinued.

An object of another aspect of this invention is to provide a novel manner for operating electrolytic cells.

Accordingly, by a broad aspect of the present invention, there is provided, in an electrolytic cell including a pair of terminals of opposite polarity, an external circuit for interconnecting said pair of terminals, the external circuit including a normally open switch and a resistor connected in series to one another. By another aspect of this invention, the external circuit also includes means for grounding the external circuit.

In an embodiment of this aspect of the invention, the grounding means alo includes a second normally open switch.

In yet another embodiment of this aspect of the present invention, the second normally open switch is interlocked with the first normally open switch so that the second normally open switch can be closed only after the first normally open switch is closed.

According to yet another embodiment of this aspect of the invention, a circuit breaker is provided in the power line supplying A.C. power to a rectifying system which supplies D.C. power to the cell, and the first normally open switch is interlocked with the circuit breaker so that the first normally open switch may not be closed until after the circuit breaker is open. By a particularly preferred embodiment of this embodiment of the invention, a time delay relay is incorporated therein in order to ensure that the peak charge has been dissipated before the first normally open switch has been closed.

By still another aspect of this invention, a method is provided for operating an electrolytic cell which comprises (a) terminating the flow of current thereto to cease the electrolysis reaction and (b) interconnecting the monopolar electrode terminals through a resistance.

By another aspect of this method, a third step is provided, namely (c) grounding the interconnected monopolar electrodes.

Thus, by aspects of this invention, a residual charge dissipating system has been provided for the bus bars of an electrolytic cell. This system may be stationary and be complete with interlocking systems to ensure correct operation and may also be a portable unit for dissipating the residual charge of one specific predetermined cell.

Preferably, the electrical power transformers should be wired to operate at near equal potentiall above and below ground.

The system includes switches which may be either single pole or multi-pole. Preferably, two switches, which are normally open, are provided. The first switch is advantageously interlocked with the A.C. circuit breaker of the power source in order to prevent operating the switch until the breaker is open. Preferably, a time delay relay is employed in order to ensure that the peak charge has been dissipated before the first switch is closed. However, this is merely an optional and not an essential feature of this invention, provided the switch is of sufficient size.

The resistor may be an open frame resistor or may be a fully enclosed resistor. The size of the resistor will, of course, determine the rate of dissipation of electrical energy, according to Ohm's law. Thus, closing the first switch provides dissipation of the electrical charge at a rate which is controlled by the resistor. The electrical energy is simultaneously being discharged from the anodes of the cell and/or cells to the cathode, and from one cell to another if they are connected in series. Closing the circuit by means of the first switch provides a faster method of discharge. The smaller the resistor, the faster the discharge, according to Ohm's law.

It is noted, therefore, that some power is discharged when the first switch is closed and this eliminates or substantially lowers the potential between the anode and cathode bus bars. However, there still may be an electrical potential in the bus bar system relative to the ground which is not discharged until the external circuit is grounded. The electrolytic cell and/or electrolyte is grounded and this provides the circuit loop.

The second switch is preferably interlocked with the first switch in order to prevent operating the second switch until after the first switch is closed. Here again, a time delay relay could be employed to lower the requirements for current capacity of the second switch, if so desired.

The second switch only provides an open or closed circuit. There is enough resistance in the cell and/or cells to prevent too sudden a discharge of electrical energy. It is possible to ground the centre of the resistor but it would still be desirable to include switch means on the ground wire. This grounding would give a slower discharge than if a separate grounding system not directly connected to the resistor were used.

In the accompanying drawings:

FIG. 1 is a schematic illustration of the novel system according to one aspect of the present invention;

FIG. 2 is a dimensionless graph of power as ordinate and time as abscissa showing the utility of the present invention; and FIG. 3 is a schematic illustration of the novel system of FIG. 1 modified according to other aspects of this invention.

Turning to FIG. 1, the electrolyte cell 10 is provided with an anode bus bar 12 and a cathode bus bar 13. Anode bus bar 12 and cathode bus bar 13 are connected to the positive and negative terminals respectively of a rectifier (not shown) which is, or may be, in turn, connected to power regulators, transformers and to an A.C. circuit breaker (also not shown) connected to a source of power (not shown). The electrolytic cell is, of course, provided with both the suitable liquor inlet means 14, preferably grounded at 11a, and effluent means 15, preferably grounded at 11b. No further description of the electrolytic cell will be given at this time since the present invention does not reside in the selection or use of any particular electrolytic cell. The electrolytic cell may be either a monopolar or a bipolar electrolytic cell and any selected cell may be modified to advantage by the residual dissipation system of an aspect of the present invention.

The invention in one of its aspects provides an external circuit shown generally by reference numeral 16 provided to interconnect the pair of terminals 12 and 13 of opposite polarity (terminal 12 being the anode bus bar, and terminal 13 being the cathode bus bar). External circuit 16 includes lines 17, 18, 19 and 20, with a first switch SW1 interposed between lines 17 and 18, and a resistor R1 interposed between lines 18 and 19. Line 17 is connected to the anode bus bar 12 and line 20 is connected to the cathode bus bar 13. Also connected to line 20 is a grounding line 21 provided with a second normally open switch SW2.

As shown in FIG. 3, the first switch SW1 is interlocked by line 29 with the A.C. circuit breaker 30 of the A.C. supply which includes lead line 31, 32, a step-up transformer 33 and a rectifier 34 having a positive line 35 leading to anode bus bar 12 and a negative line 36 leading to cathode bus bar 13. Such interlocking is to prevent closing of the switch SW1 until the circuit breaker 30 is open. Preferably, also a time delay relay 37 should be provided (as shown) in order to ensure that the peak charge has been dissipated before the switch SW1 is closed.

As shown in FIG. 3, it is preferred that the second normally open switch SW2 be interlocked with the first normally open switch SW1 by line 38 in order to prevent closing the second normally open switch SW2 until after the first normally open switch SW1 has been closed. Here again, it is preferred to employ a time delay relay 39 (as shown) in conjunction with the second normally open switch SW2 in order to lower the requirements for current capacity of the second normally open switch SW2.

The operation of the invention will be readily apparent from FIG. 2. It is noted that at point A, the A.C. circuit breaker (30) is opened, and with the electrolytic cells presently in use, the power will be dissipated to follow substantially the curve shown by line X. At a considerable length of time after the A.C. circuit breaker has been opened, a substantial residual charge still appears between the bus bars (12, 13) and the cell and/or cells (10).

On the other hand, with the improved system and method according to the present invention, at point B, the first normally open switch SW1 is closed, and the power dissipation is greatly enhanced by a sudden surge of discharged power represented by the vertical drop between points B and C. The charge then is dissipated along the curve shown by line Y to point D. At point D, the second normally open switch SW2 is closed, and the power is dissipated by means of a sudden surge of power drop between points D and E, if there is an offset potential relative to ground. If there is no such offset potential, the power drop between points D and E will be negligible. The power then continues to dissipate along the path of the curve shown as Z. Thus, at point F which is at a comparatively short time after the circuit breaker (30) has been opened, the amount of residual charge in the bus bars (12, 13) and/or the cells (10) is practically negligible when compared to the amount of the residual charge at a similar time when no such improved system is used.

I claim:

1. In an electrolytic cell, including a pair of terminals of opposite polarity, the provision of an external electrical circuit for interconnecting said pair of terminals, said external electrical circuit including:
   (a) a normally open switch and a resistor connected in series to one another across said pair of terminals of opposite polarity;
   (b) means for grounding the said external electrical circuit, said grounding means including a second normally open switch; and
   (c) time delay relay means between said first normally open switch and said second normally open switch, so that the said second normally open switch can be closed only after the said first-named, normally open switch is closed.

2. The cell of claim 1 including:
   (d) a rectifying system for supplying D.C. power to the cell;
   (e) a circuit breaker in the line supplying A.C. power to said rectifying system; and
   (f) means for interlocking said circuit breaker to said first, normally open switch, so that said first, normally open switch may not be closed until after said circuit breaker is open.

3. The cell of claim 2 including:
   (g) a time delay relay in the line interlocking said first, normally open switch and said circuit breaker, in order to ensure that the peak charge has been dissipated before said first-named normally open switch has been closed.

References Cited

UNITED STATES PATENTS

| 2,432,013 | 12/1947 | Hanson | 204—228X |
| 2,435,973 | 2/1948 | MacTaggart et al. | 204—228X |
| 2,575,712 | 11/1951 | Jernstedt | 204—228X |
| 3,023,149 | 2/1962 | Zeman | 204—228X |

FOREIGN PATENTS

| 603,910 | 10/1934 | Germany | 204—228 |

TA-HSUNG TUNG, Primary Examiner

D. R. VALENTINE, Assistant Examiner

U.S. Cl. X.R.

204—95